June 16, 1953  W. T. LYNCH  2,642,084
GAS PILOT LIGHTER
Filed Jan. 5, 1949
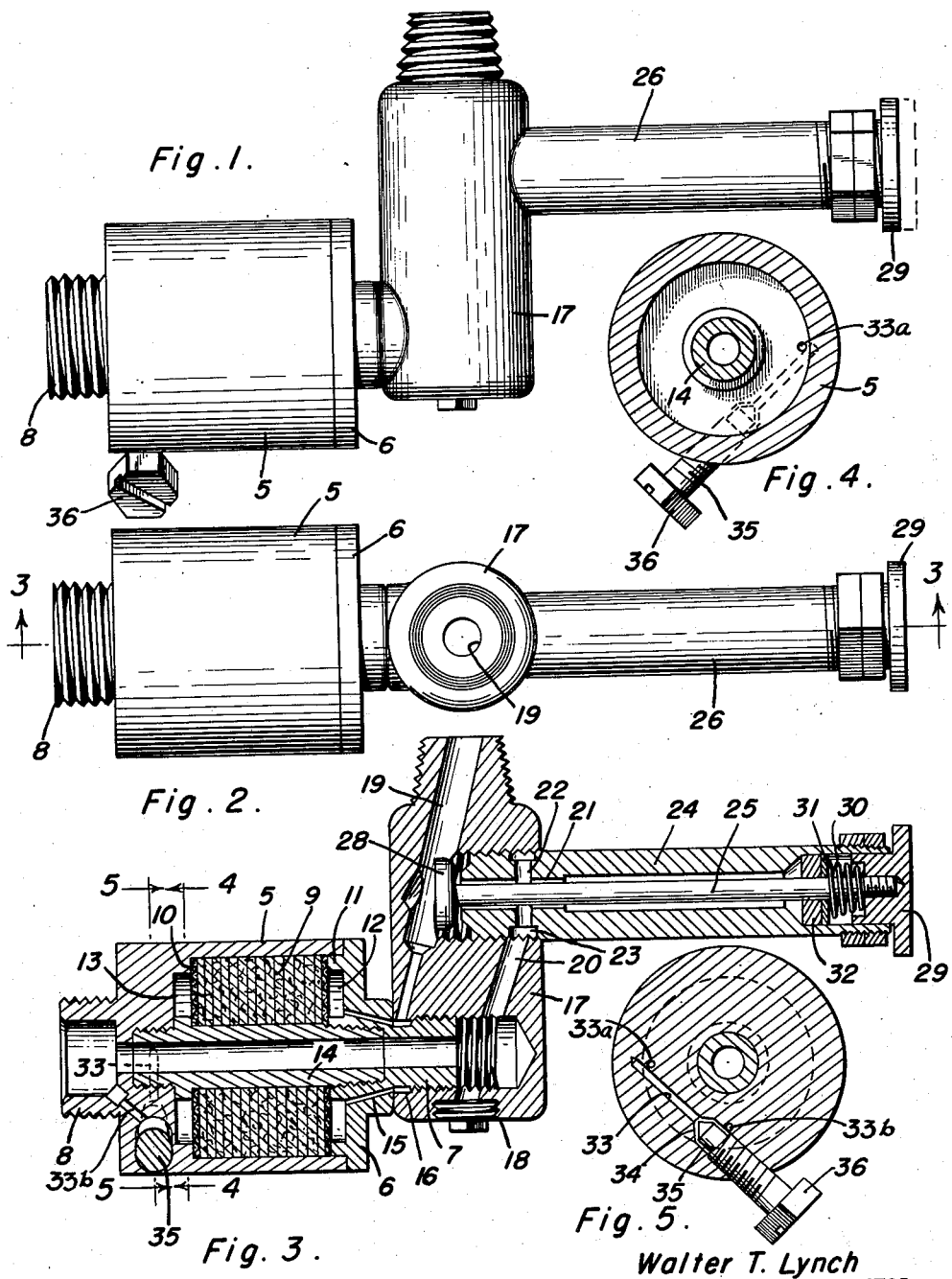
Walter T. Lynch
INVENTOR.

Patented June 16, 1953

2,642,084

UNITED STATES PATENT OFFICE 2,642,084

GAS PILOT LIGHTER

Walter T. Lynch, Collinsville, Conn., assignor to Lynch Brothers, Inc., Pine Meadow, Conn.

Application January 5, 1949, Serial No. 69,393

6 Claims. (Cl. 137—544)

The present invention relates to new and useful improvements in lighters for gas pilot burners and other small flame burners.

An important object of the invention is to provide a lighter for gas pilot burners including means to filter the gas passing through the lighter to remove the gum and other foreign substances in suspension in gases used for fuel.

A further object of the present invention is to provide a device of this character including a fitting provided with a fuel passage controlled by a needle valve to regulate the constant flame of the pilot burner and providing a filter in the fitting to filter the gas before reaching the needle valve to prevent obstruction in the passage and also providing a by-pass in the fitting controlled by a push button to feed the gas directly to the pilot burner without passing through the filter for the torch flame to ignite a burner in the usual manner.

A still further object is to provide a pilot burner lighter attachment of simple and practical construction, which is efficient and reliable in use, which may be easily and quickly installed in a gas line without necessitating any material changes or alterations in the construction thereof and which is otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a side elevational view;

Figure 2 is a top plan view;

Figure 3 is a longitudinal sectional view taken on a line 3—3 of Figure 2; and

Figures 4 and 5 are transverse sectional views taken respectively on the lines 4—4 and 5—5 of Figure 3.

Referring to the drawing in detail wherein for the purpose of illustration I have disclosed a preferred embodiment of the invention the numeral 5 designates a casing provided with filter chamber having one end closed by a cap 6 formed with an externally threaded nipple 7 and having an externally threaded nipple 8 at its opposite end. The nipple 7 is the inlet side of the filter chamber while the nipple 8 is the outlet side thereof leading to a gas pilot burner (not shown).

A filter 9 is placed in the chamber and composed of any suitable filter material and in the form of a plurality of filtering rings held at one end against the shoulder 10 in the filter chamber and held at its opposite end by an annular flange 11 formed internally on the cap 6. A chamber 12 is formed between the cap 6 and the adjacent end of the filter 9 and a similar chamber 13 is formed between the rear end of the chamber at the adjacent end of the filter.

A tube 14 passes through the center of the filter 9, with one end threaded in the cap 6 and its opposite end threaded in the rear end of the filter chamber to communicate with the outlet nipple 8. The front end of the tube 14 communicates with the inlet nipple 7.

One or more passages 15 extend from the chamber 12 through the cap 6 to an annular groove 16 formed externally of nipple 7 at its inner end.

A substantially cylindrical fitting 17 is formed with a chamber 18 in its lower portion and extending through one side of the fitting and in which the inlet nipple 7 of the filter chamber is threaded. An inclined gas passage 19 extends from the upper end of fitting 17 to the annular groove 16 in inlet nipple 7.

A by-pass passage 20 connects the gas passage 19 with chamber 18 by way of a bore 21, one or more lateral passages 22 and a circumferential groove 23 in a tubular valve guide 24 threaded in one side of the fitting 17.

A valve stem 25 is slidably mounted in the bore 21 of the valve guide with a valve 28 at the inner end of the valve stem for closing the inner end of bore 21. A push button 29 is attached to the outer end of valve stem 25 and is slidable in the valve guide and held in an outwardly projecting position by means of a coil spring 30 positioned between the inner end of the push button and a metal washer 31 in the valve guide positioned against a packing ring 32 closing the outer end of the bore 21 in the valve guide.

At the end of the filter chamber adjacent the outlet nipple 8, is a lateral passage 33 which connects the chamber 13 with the outlet nipple by way of connecting passages 33a and 33b, the passage 33 having a valve seat 34 formed therein against which the inner end of a needle valve engages to control the flow of gas through the passage 33 to the outlet nipple 8. The needle valve is threaded in one side of the filter chamber with an adjusting head 36 at its outer end.

In the operation of the device the gas passage 19 of the fitting 17 is connected to a gas supply pipe whereby gas passes through the passage 19 to the annular groove 16, then into chamber 12 by way of passages 15 and through the filter 9 into chamber 13 and then out through passage 33 to the outlet nipple 8 to thus supply gas to a constant pilot burner which burns with a relatively low flame in the usual manner.

Passage of the gas through the filter 9 removes all foreign substances which might tend to clog the passage 33 controlled by the needle valve and thus prevent extinguishing of the constant pilot burner.

When it is desired to ignite a burner adjacent the pilot burner the push button 29 is pressed inwardly thereby opening valve 28 and permitting gas to flow through bore 21, passage 22, annular groove 23 and by-pass 20 into chamber 18 and then through inlet nipple 7, tube 14 and directly to the outlet nipple 8 to thus increase the supply of fuel for igniting purposes. Spring 30 closes valve 28 when push button 29 is released.

In view of the foregoing description taken in conjunction with the accompanying drawing it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A gas pilot light control comprising a casing provided with a filter chamber having a filtering element therein for gas passing therethrough, said chamber having a member therein constituting a passage extending centrally therethrough by-passing the filtering element, a fitting connected to the casing at the inlet side of said chamber and having an uninterrupted passage leading to the filtering element and a second passage leading to the by-pass passage of the chamber, and a push-button operated valve arranged in controlling relationship with said last-named passage.

2. The combination of claim 1, wherein said by-pass passage extends axially through the filtering element.

3. The combination of claim 1, wherein said casing is formed with an outlet passage for gas passing through the filtering element, and a needle valve regulating the outlet passage.

4. A gas pilot light control comprising a casing having a filter chamber therein and gas inlet and outlet passages communicating with opposite ends of the chamber, a filter element disposed in said chamber between the ends thereof for filtering the gas as it passes from the inlet to the outlet passage, valve means in said casing for adjustably controlling the volume of gas flowing through said outlet passage, an annular member concentrically disposed within said casing and extending through said filter chamber, said annular member having a passage therethrough by-passing said filter element, and a manually operated, normally closed cut-off operatively connected to said by-pass passage.

5. The combination of claim 4 wherein said filtering element comprises a mass of porous material.

6. The combination of claim 4 wherein said filter element comprises a mass of porous material having a central opening therein, said annular member passing through said opening.

WALTER T. LYNCH.

References Cited in the file of this patent

UNITED STATES PATENTS

| Number | Name | Date |
|---|---|---|
| 883,337 | Peck | Mar. 31, 1908 |
| 1,429,713 | Cazier et al. | Sept. 19, 1922 |
| 1,506,145 | Willis et al. | Aug. 26, 1924 |
| 1,716,183 | Possons | June 4, 1929 |
| 1,955,903 | Cammen | Apr. 24, 1934 |
| 1,983,227 | Hall et al. | Dec. 4, 1934 |
| 2,251,964 | Stackhouse | Aug. 12, 1941 |
| 2,327,195 | Kosky et al. | Aug. 17, 1943 |
| 2,400,719 | Stackhouse | May 21, 1946 |

FOREIGN PATENTS

| Number | Country | Date |
|---|---|---|
| 474,728 | France | Dec. 22, 1914 |